United States Patent

[11] 3,577,766

| [72] | Inventor | John H. Walker |
| | | Dayton, Ohio |
| [21] | Appl. No. | 793,270 |
| [22] | Filed | Jan. 23, 1969 |
| [45] | Patented | May 4, 1971 |
| [73] | Assignee | The Bendix Corporation |

[54] FLUIDIC GAGE
18 Claims, 5 Drawing Figs.

[52] U.S. Cl. ................................................. 73/37.9
[51] Int. Cl. ....................................................... G01b 13/10
[50] Field of Search........................................... 73/37.8-
—.9, 45.1; 33/(Air Digest); 209/(Inquired); 137/81.5

[56] References Cited
UNITED STATES PATENTS

| 3,273,378 | 9/1966 | Gesell.............................. | 73/37.9 |
| 3,349,605 | 10/1967 | Minix.............................. | 73/37.9 |
| 3,426,582 | 2/1969 | McArthur et al............... | 73/45.1 |

*Primary Examiner*—Louis R. Prince
*Assistant Examiner*—William A. Henry, II
*Attorney*—Plante, Hartz, Smith and Thompson ABSTRACT: A fluidic gauge for determining acceptability of workpieces wherein such gage has its principal operating components made free of moving parts, utilizes a pair of pneumatic trigger switches to classify gauging signals into a predetermined acceptable range, and utilizes on-off type indicating means operatively connected to the trigger switches to indicate the character of each workpiece being checked.

Patented May 4, 1971

INVENTOR.
JOHN H. WALKER

BY Ernest J. Hix

HIS ATTORNEY

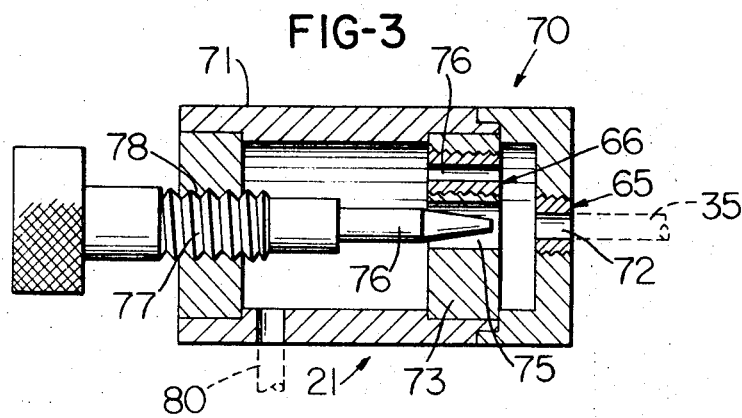
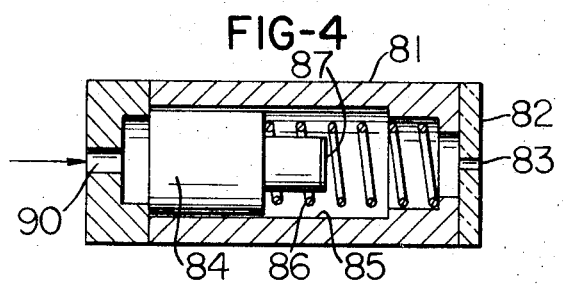
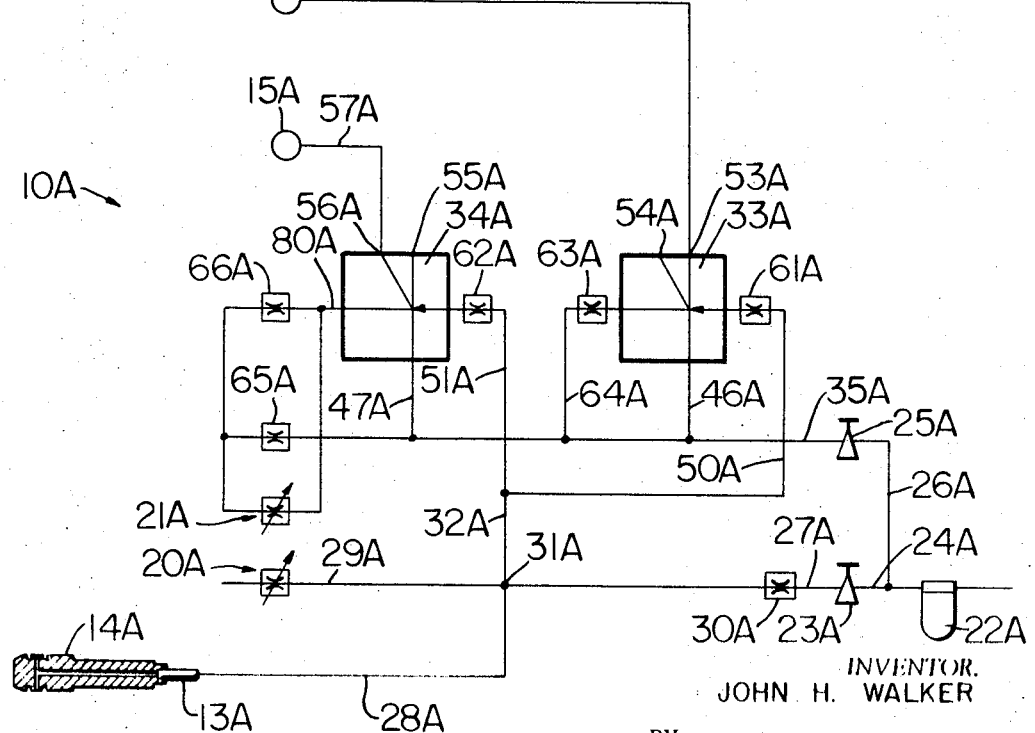
INVENTOR.
JOHN H. WALKER
BY Ernest J. Nix
HIS ATTORNEY

FLUIDIC GAGE

BACKGROUND OF THE INVENTION

Many gauges currently used to provide dimensional measurements utilize components which have numerous moving mechanical parts which are subject to wear and damage whereby such gauges provide erroneous measurements after extended use. In addition, many current gauges require that the gauge operator read some type of a movable indicator against an associated scale and inherently any reading of this type is subject to operator error.

SUMMARY

This invention provides a fluidic gauge which is of simple and economical construction, has its principal operating components made free of moving mechanical parts, provides an on-off indication in response to a particular gauging signal, and provides reliable operation even after extended use. Further, the cooperating component parts of the gauge of this invention are such that in using such gauge to provide dimensional measurements it is substantially impossible to set up the gauge for use with wrong masters or when using a worn or damaged gauging head.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 3 is a view with parts in elevation and parts in cross section of a device which may comprise the gauge of FIG. 1 and may be used to establish one limit of an acceptable range of gauging signals whereby a workpiece providing a signal within such range would be considered acceptable;

FIG. 4 is a cross-sectional view of an exemplary indicator which is typical of the three indicators comprising in the gauge of FIG. 1; and FIG. 5 is a schematic view similar to FIG. 2 and illustrating the principal cooperating components of another exemplary embodiment of the gauge of this invention.

DESCRIPTION OF ILLUSTRATED EMBODIMENTS

Figure 1:
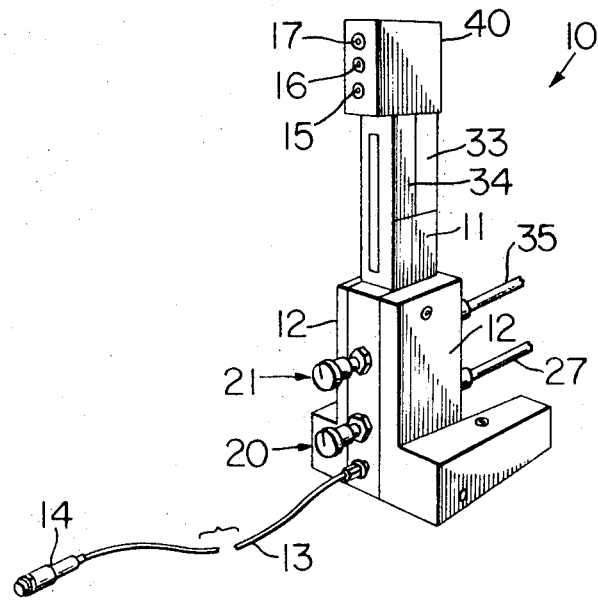
FIG. 1 is a perspective view illustrating one exemplary embodiment of a fluidic gauge of this invention.

Reference is now made to FIG. 1 of the drawings wherein an exemplary fluidic gauge of this invention is illustrated and designated by the reference numeral 10. The gauge 10 is utilized in providing dimensional measurements and comprises housing means 11 housing and supporting the principal operating components of the gauge in a protected position and a pair of supports 12 suitably fastened in position on opposite sides of the housing 11 and holding such housing in an upright manner for easy accessibility and viewing by a gauge operator. The gauge 10 has a flexible tube 13 extending from the front face of the housing 11 and in this example of the invention the tube 13 has a gauging head shown as a spindle 14 suitably fastened to its terminal outer end.

The exemplary gauge 10 and its associated gauging spindle 14 are illustrated in a typical back pressure circuit, the operation of which is well known in the art. The spindle 14 of the gauge 10 is associated with a pair of master setting rings having precise openings of different diameters and the gauge is set, as will be described in detail subsequently, to establish an acceptable range of gauging signals. The spindle 14 may then be associated with an opening in a workpiece to be measured to determine whether such opening falls within the predetermined acceptable range and hence determine acceptability of the workpiece.

Figure 2:
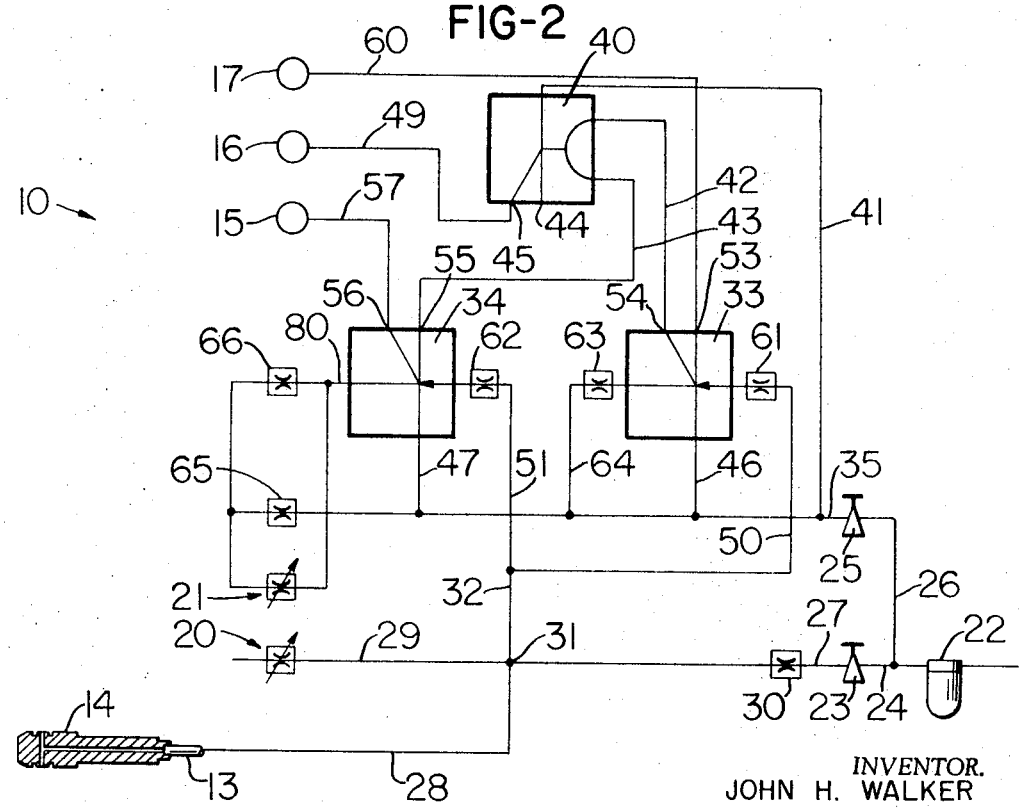
FIG. 2 is a schematic view illustrating the principal operating components of the gauge of FIG. 1.

The gauge 10 has indicating means shown as a plurality of three visual indicators 15, 16 and 17 each indicating respectively whether a particular workpiece has an opening (as measured by inserting spindle 14 in such opening) which is smaller than the lower limit of the acceptable range, within the acceptable range, or larger than the upper limit of the acceptable range, see FIGS. 1 and 2. The gauge 10 also has adjusting means shown as a pair of variable restrictors 20 and 21 which are utilized together with the master setting rings to establish the limits of the acceptable range within which workpieces measured by the gauge 10 would be considered acceptable and the operation of the adjusting means will be described in detail subsequently.

The gauge 10 preferably utilizes air as an operating medium and the air may be supplied under pressure from any suitable source and suitably filtered through a filter 22. The filtered air is supplied to a pressure regulator 23 through a line 24 and to another pressure regulator 25 through a line 26. The regulated air from the regulator 23 passes through a line 27 which has a fixed restrictor 30 installed therein and the regulated air from the fixed restrictor 30 passes through what will be referred to as a common junction 31 and through a line 28 to the gauging spindle 14. The line 27 has an extension line 29 in flow communication with and extending from the common junction 31 with the adjustable restrictor 20 being provided at the terminal end of the line 29. A line or conduit 32 is also provided in fluid flow communication with the common junction 31 and it will be apparent from FIG. 2 that each gauging signal is provided as a function of the characteristics of a particular workpiece as determined by gauge head 14 associating therewith and as influenced by the amount of air bleeding through the adjustable restrictor 20.

The gauge 10 has a pair of fluidic signal classifying devices 33 and 34 operatively connected to the conduit 32 and each signal classifying device 33 and 34 is supplied with primary air flow under regulated pressure through associated conduits suitably connected to a line 35 from the pressure regulator 25. The flow of primary air through each device 33 and 34 and hence the operation of each device 33 and 34 is in essence controlled by the effective energy of the gauging signal provided through the conduit 32 and as will be described in detail subsequently.

The gauge 10 also has a fluidic gate device 40 which is supplied with air under regulated pressure through a conduit 41 connected in fluid flow communication with the conduit 35 and the gate device 40 is operatively connected to receive an input from the classifying devices 33 and 34 through associated lines 42 and 43 respectively. The gate device 40 performs an AND logic function in a manner which is well known in the art and consequently its component parts will not be described in detail.

The gate device 40 has no moving parts and its primary air flow, supplied through the line 41 as previously mentioned, may be discharged from such device through an outlet opening 44 under conditions where an unacceptable workpiece is being gauged. If the workpiece being gauged is acceptable a combined signal is received through input lines 42 and 43 whereupon primary air flow through the gate device 40 is shifted from its outlet 44 to its outlet 45 and through a line 49 to the indicator 16 which is actuated to indicate an acceptable part.

Each classifying device 33 and 34 is essentially a pneumatic trigger switch which is actuated (to shift its primary air flow) once its particular limit is exceeded and each of such devices may be referred to as a "fluidic Schmitt Trigger." Each trigger switch 33 and 34 has no moving mechanical parts and is comprised essentially of a flip-flop and amplifying means defined as a plurality of proportional amplifiers and a NOR logic gate. The amplifying means provided in each switch 33 and 34 provides a reliable triggering action at the particular limit set on the associated trigger switch with minimum hysteresis and thereby assures that the particular limit is essentially the same regardless of the direction from which the final pressure signal is reached.

The trigger switches 33 and 34 are provided with a main or primary air supply through conduits 46 and 47 respectively which are connected to the conduit 35. The gauging signal provided through the conduit 32 is provided to the trigger switches 33 and 34 through lines 50 and 51 respectively. The trigger switch 33 is set so that it is actuated only under conditions where a particular gauging signal provided through its line 50 is greater than a first magnitude defining a lower limit of a predetermined acceptable range whereupon primary air flow through the trigger switch 33 is diverted from an outlet 53 thereof to ambient to its outlet 54 and through the line 42 to the gate device 40. Similarly, the trigger switch 34 is set so that it is actuated only if a particular gauging signal provided through its conduit 51 is greater than a second magnitude defining the upper limit of the predetermined acceptable range whereupon primary air flow through the trigger switch 34 is diverted from its outlet 55 normally communicating with conduit 43 to its outlet 56 which is in fluid flow communication with the conduit 57 operatively connected to the indicator 15.

The indicator 17 is connected to the outlet 53 of the trigger switch 33 through a conduit 60 and is actuated by air provided through conduit 60 in the event the gauging signal provided through the conduit 32 is of a magnitude less than the limit defined by the trigger switch 33 thereby signifying, in this example of the invention, a workpiece having an opening which is oversize. In particular, if a gauging signal is less than the magnitude required to trigger the switch 33 the energy of the air jet from conduit 50 into the trigger switch 33 will not be sufficient to divert primary air flow into outlet 54 whereupon flow is provided through outlet 53 and conduit 60 to actuate the indicator 17. With a part having an oversize opening, it will also be appreciated that there will be some air flow through outlet opening 55 of the trigger switch 34 to the gate device 40; however, the effective energy thereof is not sufficient to actuate the gate device 40.

The indicator 15 provides an indication in the event the gauging signal provided through conduit 32 is greater than a second or higher magnitude determined by the setting of the trigger switch 34 whereupon the gauging signal provided to the trigger switch 34 through the conduit 51 causes primary air flow to be diverted from the outlet 55 to the discharge 56 of the trigger switch 34 and through the conduit 57 to actuate and provide an indication on the indicator 15. In this example of the invention, the indication on the indicator 15 signifies a workpiece having an undersized opening and the substantially greater gauging signal is provided through the conduit 32 because less air escapes from the gauge head 14 due to less clearance between the particular workpiece and gauge head 14 which causes increased pressure in the conduit 51 and hence diversion of air flow in the trigger switch 34 from its outlet 55 to its outlet 56. With a part having an undersize opening the flow through trigger switch 33 will also be diverted from its outlet 53 to its outlet 54 which supplies gate device 40; however, the effective energy of the air to gate device 40 under this condition is not sufficient to actuate such gate device.

In the event that a workpiece being measured by the spindle 14 has an opening within the acceptable range the gauging signal provided through the conduit 32 will be less than the amount required to trigger the trigger switch 34 and greater than the amount required to trigger the trigger switch 33 whereby flow is provided through both conduits 42 and 43 to the gate device 40. The combined energy of air provided through these conduits is sufficient to actuate gate device 40 and divert its primary air flow from its outlet opening 44 to ambient to its outlet opening 45 and into conduit 49, causing the indicator 16 to be actuated.

The regulator 23 used in association with the gauge 10 is preferably an adjustable regulator and, if desired, may be adjusted between a plurality of predetermined values. The fixed restrictor 30 may also be of different sizes with each size corresponding to a predetermined setting of the pressure regulator 23 whereby standard back pressure gauge tooling may be utilized with the gauge 10 in a simple and efficient manner. For example, one setting may be provided on the regulator 23 and the fixed restrictor 30 provided with an effective diameter of 0.0225 inch whereby the spindle 14 may be provided with two 0.0785-inch diameter open jets to provide 1 p.s.i. change for each 0.0001 inch change in clearance between the spindle jets and the workpiece. Similarly, for another predetermined setting on the pressure regulator 23 the fixed restrictor 30 may be provided with an effective diameter of 0.035 inch whereby the spindle 14 may be provided with two 0.0785-inch diameter open jets to provide 1 p.s.i. change for each 0.00025 inch change in clearance between the spindle jets and the workpiece. Thus, the basic circuit illustrated in FIG. 2 of the drawings may be utilized with practically all standard back pressure gauge tooling substantially without modification and merely by providing a proper restrictor 30 with a corresponding setting therefor being provided on the pressure regulator 23. It will also be appreciated that the restrictor 30 is made so that it is easily installed on and removed from the gauge 10.

The trigger switches 33 and 34 may utilize a pair of fixed restrictors 61 and 62 respectively to reduce the magnitude and hence effectiveness of the gauging signal from the conduit 32 so as to control the operating level of the particular trigger switch. In addition, the trigger switch 33 utilizes a fixed restrictor 63 which is operatively connected to the conduit 35 through a conduit 64 and has its outlet connected to the trigger switch 33 so that the air flowing therethrough opposes the air flow defining the gauging signal and flowing through the restrictor 61 whereby the energy level of air flowing through fixed restrictor 61 and fixed restrictor 63 determines whether primary air flow through switch 33 is discharged through its outlet 53 or 54. The fixed restrictor 63 is preferably chosen so that a signal of 12 p.s.i.g. in the gauging circuit is required to trigger the switch 33.

The trigger switch 34 has a pair of fixed restrictors 65 and 66 which, as will be apparent from the drawings, are arranged in series. Further, it will be seen that the adjustable restrictor 21 is arranged in parallel with the restrictor 66. The effective areas of the fixed restrictors 65 and 66 are chosen such that trigger switch 34 switches from its outlet 55 to its outlet 56 at a pressure level of 17 to 19 p.s.i.g. gauging signal provided thereto through conduits 32 and 51. The fixed restrictor 65 operates to limit the bias set on the trigger switch 34 from being set too high even with the adjustable restrictor 21 being fully opened and the restrictor 66 limits the bias from being set too low even with adjustable restrictor 21 being fully closed.

Thus, it is seen that an operator using the fluidic gauge 10 must set a 5 to 7 p.s.i. spread between the setting of the trigger switch 33 and the setting of the trigger switch 34, which essentially precludes the use of wrong master rings in association with the gauging spindle 14 of the exemplary gauge 10.

The adjustable restrictor 21 may be a single unit of simple construction and utilized in a known manner essentially as shown in FIG. 2 of the drawings. However, the restrictor 21 may be provided as a part of an associated assembly 70 (see FIG. 3) comprised of an outer housing 71 having the restrictor 65 defined as a threaded insert and having a fixed opening 72 extending therethrough. The restrictor 66 may be provided as a threaded insert in a disclike member 73 detachably fastened within the housing 71 and the restrictor 66 has a fixed opening 76 extending therethrough.

The adjustable restrictor 21 comprises an opening 75 in member 73 and the effective area of opening 75 is modified by axial movement of a plug 76. The plug 76 has a threaded forward portion 77 which is threaded through a cooperating threaded opening 78 in housing 71 and a knurled knob is provided for threading the threaded portion 77 in and out. By modifying the effective area of the opening 75 the energy of the bias air provided to the trigger switch 34 through its conduit 80 is modified whereby the trigger point for switch 34 is set.

Thus, it is seen that the assembly 70 may be provided which incorporates the three components 21, 65, and 66 into a single unit so as to provide a foolproof setting of trigger switch 34 and hence the upper limit of the gauging range and thereby assure that an operator cannot use wrong masters.

The adjustable restrictor 20 provided on the fluidic gauge 10 is provided to enable foolproof setting of the limit on the trigger switch 33 and hence the lower limit of the gauging range. The circuit is designed such that when the trigger switch 33 is set using new, i.e., substantially unworn tooling, the bleed through the adjustable restrictor 20 is equivalent to allowable tool wear.

As previously mentioned, indicating means in the form of a plurality of three indicators 15, 16, and 17 comprise the gauge 10 and the indicators 15—17 of this example are simple on-off visual indicators of substantially identical construction. A typical indicator is illustrated in FIG. 4 of the drawings which is representative of all three indicators 15, 16 and 17.

Each indicator comprises an outer housing 81 having a transparent or translucent member 82 fixed to the forward end thereof and the member 82 has a vent hole 83 provided therein. A piston 84 is provided and supported for axial sliding movement within a bore 85 in the housing 81 and the piston 84 is urged rearwardly by compression spring 86. Each indicator 15—17 is in the form of an on-off indicator and is turned "on" or actuated by its associated piston 84 moving a bright front face 87 thereof forwardly against member 82. As the piston 84 is moved forwardly it overrides the compression spring 86 and with the bright surface 87 arranged immediately adjacent the front member 82 it is readily visible, signifying the associated indicator is on.

Each indicator 15—17 is normally "off," inasmuch as its associated piston 84 is held in a retracted position by the compression spring 86 and each indicator is turned on or actuated by air provided through an opening 90 in the rear portion of its housing 81. Thus, each indicator 15, 16, and 17 is turned on by air under pressure being provided thereto through its associated line 57, 49, and 60 respectively and in the manner previously described. In this example of the invention an undersize opening in a workpiece results in the indicator 15 being turned on, an oversize opening in a workpiece results in the indicator 17 being turned on, and an opening in a workpiece which is within the predetermined acceptable range results in the indicator 16 being turned on. The reference to an indicator being turned "on," merely refers to the fact that the associated bright surface 87 of a particular indicator has been moved outwardly against its associated transparent or translucent front plate 82 by air under pressure.

The gauge 10 is set for operation with optimum simplicity and in a foolproof manner so as to preclude the use of wrong tooling and/or wrong masters whereby a comparatively unskilled operator may efficiently use such gauge with minimum likelihood of error. In particular, the gauge 10 is set for operation by first associating the gauge head or spindle 14 with a master ring having a maximum size opening therein and normally expected to provide a gauging signal of comparatively low magnitude which defines the lower limit of a predetermined acceptable range. The indicator 17 is on at this point in the setup procedure and the adjustable restrictor 20 is then adjusted until the indicator 17 goes off. It will be appreciated that by adjusting the adjustable restrictor 20 a partial bleeding of air to atmosphere is provided to thereby respectively modify the energy of the gauging signal in the conduit 32. After adjusting the adjustable restrictor 20 the spindle 14 is then associated with a master ring having a minimum opening therein which is normally expected to provide a gauging signal of greater magnitude corresponding to the upper limit of the range of gauging signals defining an acceptable part whereupon the indicator 16 comes on. The adjustable restrictor 21 is then adjusted until the indicator 16 goes off and the indicator 15 comes on.

In one actual application the effective area of the adjustable restrictor 21 cooperating with the areas of the fixed restrictors 65 and 66 results in the trigger switch 34 being set to switch at a value between 5 and 7 p.s.i. greater than the pressure required to trigger the switch 33. In particular, the settings utilized would be to provide a triggering action at 12 p.s.i.g. for the trigger switch 33 and a triggering action between 17 and 19 p.s.i.g. for the trigger switch 34.

In the event that the gauging head or spindle 14 is worn excessively it would be impossible to set either limit. If incorrect masters are used it would be impossible to set both limits. In particular, if the masters are too large, it would be impossible to set the lower limit but the upper limit could be set; and, if the masters are too small the lower limit can be set but the upper limit cannot.

It will be appreciated that there may be an interaction between adjustable restrictors 20 and 21 if such restrictors are varied indiscriminately during the setup procedure. To avoid such interaction, the variable restrictor 20 is adjusted first, followed by making the necessary adjustments on the restrictor 21.

The operation of a fluidic gauge 10 is of utmost simplicity and as will be apparent from the above description the main operating parts thereof have no moving mechanical parts. Further, the character of a particular part being gauged, such as the size of an opening in a workpiece being gauged, is precisely and accurately determined at a glance merely by associating the spindle 14 with a particular workpiece and observing whether the indicator 15, 16, or 17 is on, indicating respectively that the workpiece has an undersized opening, an acceptable opening, or an oversized opening therein. To further aid an operator utilizing the gauge 10, the indicators 15 and 17 may be provided so that their surfaces 87 are made of a bright red material, while the surface 87 of the indicator 16 may be made of a bright green material.

Another exemplary embodiment of a fluidic gauge of this invention is illustrated schematically in FIG. 5 of the drawings. The fluidic gauge illustrated in FIG. 5 is very similar to the gauge 10; therefore, such gauge will be designated generally by the reference numeral 10A and components of the gauge 10A which are very similar to corresponding parts of the gauge 10 will be designated by the same reference numeral as in gauge 10, also followed by the letter designation A and not described again. Further, a detailed description will not be made of gauge 10A; however, the operation of gauge 10A and the detailed operation of its component parts is very similar to the detailed operation of gauge 10 and its corresponding component parts and reference may be made thereto for an understanding of the operation of the components of the gauge 10A.

Basically, the gauge 10A utilizes all the component parts of the gauge 10, with the exception of the AND logic gate device 40, the associated indicator 16, and conduits leading to and from such components. In essence, the gauge 10A only provides a signal when an unacceptable workpiece is being gauged.

Thus, upon inserting the gauging spindle 14A within an opening of an associated workpiece which is oversize, a gauging signal is provided through conduits 32A and 50A, through the trigger switch 33A, and through conduit 60A to provide indication on the indicator 17A. Similarly, upon inserting the gauging spindle 14A within an opening of an associated workpiece which is undersize a gauging signal is provided through the conduits 32A and 51A, through the trigger switch 34A (causing a switching thereof), and through conduit 57A to provide an indication on the indicator 15A. Upon associating the spindle 14A with the workpiece having an acceptable opening therein, the magnitude of the gauging signal in the line 32A is such that it triggers the trigger switch 33A from its outlet 53A to its outlet 54A, yet such gauging signal is not of sufficient magnitude to trigger the trigger switch 34A from its outlet 55A to its outlet 56A whereupon air is discharged through outlets 54A and 55A to ambient and no gauging signal indication is provided on indicators 15A and 17A whereby the workpiece being measured would be acceptable.

In the exemplary embodiments of this invention presented in this specification and drawings, the gauge is shown as having a gauging spindle which is adapted to be associated with master rings and utilized in checking the sizes of openings in associated workpieces. However, it is to be understood that the gauge of this invention may be utilized in numerous other applications and is not limited to applications where dimensional measurements are being made. Further, it is to be understood that in dimensional measurement applications the gauging device of this invention may be effectively used and provided with required tooling to enable rapid and efficient checking of internal diameters and conditions, external diameters and conditions, height, width, depth, and all other conditions which may be checked utilizing a fluid as a gauging medium. In addition, the gauging head utilized may be provided with either contact or noncontact-type components of any desired mechanical configuration known in the art.

In this example of the invention the gauge 10 is shown in FIG. 1 as having lines 35 and 27 leading directly to the housing 11 with the regulators 23 and 25 not shown; however, if desired, such regulators may be fastened to and supported by the housing 11.

The detailed physical constructions of the trigger switches and the AND gate, for the gauge 10, have not been shown in the drawings. However, any suitable physical construction, well known in the art, may be used for these components.

It will also be appreciated that the members 33, 34, and 40 of gauge 10 and the members 33A and 34A of gauge 10A, together with their associated restrictors and conduits, may be provided in each instance as a single integrated circuit module. Also, the reference made throughout this specification to lines and conduits is intended to cover all types of passages for conveying fluids, whether provided as openings or passages in separate members or as openings or passages in a plate or other member having the trigger switches, for example, integrally provided therein.

Each exemplary embodiment of this invention presented in this specification utilizes two limit devices similar to limit device 34. However, it will be appreciated that any desired number (for example, a plurality of more than two) of limit devices may be utilized to establish a corresponding number of limits for an associated gauge.

While present exemplary embodiments of this invention have been illustrated and described, it will be recognized that this invention may be otherwise variously embodied and practiced within the scope of the following claims.

I claim:

1. A fluidic gauge having principal operating components made free of moving parts, said gauge comprising, signal means providing a fluidic gauging signal, a pair of fluidic signal classifying devices operatively connected to said signal means, each of said classifying devices being made as a fixed structure which is provided with fixed passages extending therethrough so that each of said classifying devices is free of moving mechanical parts, one of said classifying devices being actuated only if a particular gauging signal is greater than a first magnitude defining a lower limit of a predetermined range and the other of said devices being actuated only if said particular gauging signal is greater than a second magnitude defining an upper limit of said predetermined range, and fluid operated indicating means operatively connected to said devices, said indicating means comprising a first on-off fluid operated indicator operatively connected to said one classifying device and providing a first indication in the event said particular signal is less than said first magnitude and a second on-off fluid operated indicator operatively connected to said other classifying device and providing a second indication in the event said particular gauging signal is greater than said second magnitude.

2. A gauge as set forth in claim 1 and further comprising adjusting means for adjusting a classifying device to define the point at which the classifying device is actuated and thereby establish its corresponding limit.

3. A fluidic gauge having principal operating components made free of moving parts, said gauge comprising, signal means providing a fluidic gauging signal, a pair of fluidic signal classifying devices operatively connected to said signal means, one of said classifying devices being actuated only if a particular gauging signal is greater than a first magnitude defining a lower limit of a predetermined range and the other of said devices being actuated only if said particular gauging signal is greater than a second magnitude defining an upper limit of said predetermined range, each of said classifying devices being free of moving mechanical parts, and fluid operated indicating means operatively connected to said devices, said indicating means comprising a first indicator operatively connected to said one classifying device and providing a first indication in the event said particular signal is less than said first magnitude and a second indicator operatively connected to said other classifying device and providing a second indication in the event said particular gauging signal is greater than said second magnitude, said indicators comprising self-contained on-off visual indicators, each of said indicators being normally "off" and being turned "on" by the action of fluid provided thereto from an associated classifying device.

4. A gauge as set forth in claim 3 and further comprising adjusting means for adjusting said classifying devices said adjusting means comprising a first variable flow restrictor provided in said gauge for setting the limit on said one classifying device and a second variable flow restrictor for setting the limit on said other classifying device.

5. A fluidic gauge having principal operating components made free of moving parts, said gauge comprising, signal means providing a fluidic gauging signal, a pair of fluidic signal classifying devices operatively connected to said signal means, one of said classifying devices being actuated only if a particular gauging signal is greater than a first magnitude defining a lower limit of a predetermined range and the other of said devices being actuated only if said particular gauging signal is greater than a second magnitude defining an upper limit of said predetermined range, indicating means operatively connected to said devices, said indicating means comprising a first indicator operatively connected to said one classifying device and providing a first indication in the event said particular signal is less than said first magnitude and a second indicator operatively connected to said other classifying device and providing a second indication in the event said particular gauging signal is greater than said second magnitude, and adjusting means for adjusting said classifying devices, said adjusting means comprising a first variable flow restrictor provided in said gauge for setting the limit on said one classifying device and a second variable flow restrictor for setting the limit on said other classifying device, said second variable restrictor cooperating with a pair of fixed flow restrictors arranged in series and provided to bias said second classifying device, said second variable restrictor being arranged in parallel with one of said fixed restrictors, said one fixed restrictor having an effective area of sufficient size to prevent the bias on said second classifying device from being set too low with said second variable restrictor fully closed and said other fixed restrictor having an effective area of a size which prevents the bias on said second classifying device from being set too high with said second variable restrictor fully open.

6. A gauge as set forth in claim 5 in which said second variable restrictor and said pair of cooperating fixed restrictors are made as a single assembly.

7. A fluidic gauge having principal operating components made free of moving parts, said gauge comprising, signal means providing a fluidic gauging signal, a pair of fluidic signal classifying devices operatively connected to said signal means, one of said classifying devices being actuated only if a particular gauging signal is greater than a first magnitude defining a lower limit of a predetermined range and the other of said devices being actuated only if said particular gauging signal is greater than a second magnitude defining an upper limit of said predetermined range, a fluidic gate device operatively connected to receive an input from said one classifying device once said gauging signal exceeds said first magnitude and operatively connected to said other classifying device to receive an input once said gauging signal is less than said second magnitude, said gate device being actuated by a combined signal from both of said classifying devices, and indicating means operatively connected to said devices, said indicating means comprising a first indicator operatively connected to said one classifying device and providing a first indication in the event said particular signal is less than said first magnitude, a second indicator operatively connected to said other classifying device and providing a second indication in the event said particular gauging signal is greater than said second magnitude, and a third indicator operatively connected to said gate device to provide an indication once said gate device is actuated by a gauging signal having a magnitude between said first and second magnitudes and hence within said predetermined range.

8. A gauge as set forth in claim 7 in which said gate device and said classifying devices comprise operating units made free of moving mechanical parts, each of said devices being provided with a primary air supply at a predetermined regulated pressure.

9. A gauge as set forth in claim 7 particularly adapted for dimensional measurements and further comprising an air gauge head adapted to associate with a workpiece to provide said fluidic gauging signal.

10. A gauge as set forth in claim 7 in which each of said indicators comprises an on-off visual indicator operated solely by fluid provided from an associated classifying device.

11. A fluidic gauge comprising; a gauging head adapted to associate with a workpiece to provide a fluidic gauging signal; a pair of fluidic signal classifying devices operatively connected to said gauging head; one of said classifying devices being actuated only if a particular gauging signal is greater than a first magnitude defining a lower limit of a predetermined range and the other of said devices being actuated only if said particular gauging signal is greater than a second magnitude defining an upper limit of said predetermined range; a fluidic gate device operatively connected to receive an input from said one classifying device once said gauging signal exceeds said first magnitude and operatively connected to said other classifying device to receive an input once said gauging signal is less than said second magnitude; indicating means operatively connected to said devices; said indicating means comprising a first on-off indicator operatively connected to said one classifying device and providing an indication when said gauging signal is less than said first magnitude, a second on-off indicator operatively connected to said other classifying device and providing an indication when said gauging signal is greater than said second magnitude, and a third on-off indicator operatively connected to said gate device and providing an indication when said gauging signal is between said first and second magnitudes and hence within said predetermined range; a first variable restrictor for setting the limit on said one classifying device; and a second variable restrictor for setting the limit on said other classifying device; said gauge being set for operation by first associating said gauge head with a master normally expected to provide a gauging signal of said first magnitude whereupon said first on-off indicator is on and said first variable restrictor is adjusted until said first on-off indicator goes off, said gauge head is then associated with another master normally expected to provide said gauging signal of said greater magnitude causing said third on-off indicator to come on and said second restrictor is then adjusted until said third on-off indicator goes off and said second on-off indicator comes on, the cooperating relationship of the component parts of said gauge being such that in the event said gauging head is worn excessively it would be impossible to adjust said first restrictor so that said first indicator goes off and in the event incorrect masters are used it would be impossible to adjust said first variable restrictor so that said first indicator goes off and impossible to adjust said second variable restrictor so that said second indicator comes on, whereby a substantially foolproof gauge is provided.

12. A gauge as set forth in claim 11 in which said indicators comprise on-off visual indicators each being operated solely by fluid from an associated classifying device.

13. A gauge as set forth in claim 11 and further comprising a readily removable fixed area flow restrictor installed in series with said gauge head and adapted to be supplied with fluid at a predetermined regulated pressure to enable said gauge to be effectively utilized with standard tooling to provide different amplifications of the gauging signal merely by the proper selection and matching of said fixed restrictor and its associated regulated pressure.

14. A gauge as set forth in claim 11 in which each of said classifying devices comprises a pneumatic trigger switch which is actuated once its particular limit is exceeded.

15. A gauge as set forth in claim 11 in which said second variable restrictor cooperates with a pair of fixed flow restrictors arranged in series and provided to bias said second classifying device, said second variable restrictor being arranged in parallel with one of said fixed restrictors, said one fixed restrictor having an effective area of sufficient size to prevent the bias on said second classifying device from being set too low with said second variable restrictor fully closed, and said other fixed restrictor having an effective area of a size which prevents the bias on said second classifying device from being set too high with said second variable restrictor fully open.

16. A gauge as set forth in claim 15 in which said second variable restrictor and said pair of cooperating fixed restrictors are made as a single assembly.

17. A gauge as set forth in claim 11 in which each of said classifying devices comprises a pneumatic trigger switch with each trigger switch comprising a flip-flop and cooperating amplifying means providing a reliable triggering at its associated limit with minimum hysteresis.

18. A gauge as set forth in claim 11 in which said fluidic gate device comprises an AND logic gate.